(12) United States Patent
Yan (10) Patent No.: US 9,973,013 B2
(45) Date of Patent: May 15, 2018

(54) UNIVERSAL MAGNETIC MOUNTING CHARGER FOR MOBILE DEVICES

(71) Applicant: Bing Yan, Guangdong (CN)

(72) Inventor: Bing Yan, Guangdong (CN)

(73) Assignee: Dongguan Yanpu Equipment Co. LTD, Dongguan (CN)

( * ) Notice: Subject to any disclaimer, the term of this patent is extended or adjusted under 35 U.S.C. 154(b) by 163 days.

(21) Appl. No.: 15/196,402

(22) Filed: Jun. 29, 2016

(65) Prior Publication Data

US 2017/0338676 A1    Nov. 23, 2017

(30) Foreign Application Priority Data

May 18, 2016   (CN) .................... 2016 2 0449247 U (51) Int. Cl.
*H02J 7/00*    (2006.01)
*H02J 7/14*    (2006.01)

(52) U.S. Cl.
CPC .......... *H02J 7/0044* (2013.01); *H02J 7/0027* (2013.01); *H02J 7/14* (2013.01)

(58) Field of Classification Search
None
See application file for complete search history.

(56) References Cited

U.S. PATENT DOCUMENTS

| | | | | |
|---|---|---|---|---|
| 8,398,409 B2* | 3/2013 | Schmidt | ................ | H01R 11/30 439/39 |
| 8,894,419 B1* | 11/2014 | Buelow | .............. | H01R 13/6205 439/218 |
| 8,918,548 B2* | 12/2014 | Wang | .................... | G06F 1/1626 361/679.56 |
| 8,991,775 B2* | 3/2015 | White | ................... | F16M 11/04 108/50.02 |
| 9,062,695 B2* | 6/2015 | Witter | ............... | H01R 13/6205 |
| 9,088,097 B2* | 7/2015 | Kim | ................... | H01R 13/6205 |
| 9,152,177 B2* | 10/2015 | Feldstein | ............... | F16M 11/22 |
| 9,270,130 B2* | 2/2016 | Arai | ...................... | H02J 7/0042 |
| 9,318,915 B2* | 4/2016 | Miller | ..................... | H02J 7/025 |
| 9,537,321 B2* | 1/2017 | Oo | .......................... | H02J 5/005 |
| 9,559,477 B2* | 1/2017 | Liu | ......................... | H01R 24/38 |
| 9,567,776 B2* | 2/2017 | Moock | ............... | E05B 73/0082 |
| 9,667,092 B2* | 5/2017 | Miller | ..................... | H02J 7/025 |
| 9,678,537 B2* | 6/2017 | Kupferstein | .......... | G06F 1/1632 |
| 9,773,601 B2* | 9/2017 | Breiwa | .................. | H01F 7/0252 |
| 9,799,436 B2* | 10/2017 | Lee | .......................... | H01F 7/021 |
| 9,800,283 B2* | 10/2017 | Schmidt | ............... | H04B 1/3877 |
| 9,848,071 B2* | 12/2017 | Thiers | ..................... | H04M 1/04 |
| 2003/0045246 A1* | 3/2003 | Lee | ........................ | H01Q 1/245 455/575.1 |
| 2008/0111518 A1* | 5/2008 | Toya | ..................... | H02J 7/0044 320/108 |

(Continued)

*Primary Examiner* — Xanthia C Cunningham
(74) *Attorney, Agent, or Firm* — Jie Tan; JT Law Office (57) ABSTRACT

A mobile device charger with mounting ability is disclosed. An attachment seat is attached to a mobile device, the attachment seat has a charging cable and charging plug that can be plugged into the charge port of mobile device. The attachment seat has an electrode section and a magnet section to interact with a charger mounting support that has a matching charging head with an electrode section and a magnet section. The charger mounting support also has a rotation section and a power converting configuration and port for power supply port.

20 Claims, 9 Drawing Sheets

(56) References Cited

U.S. PATENT DOCUMENTS

| | | | | |
|---|---|---|---|---|
| 2008/0169923 A1* | 7/2008 | Belden | | A47F 7/024 340/568.3 |
| 2009/0166483 A1* | 7/2009 | Marsilio | | A47F 7/024 248/187.1 |
| 2010/0146308 A1* | 6/2010 | Gioscia | | G06F 1/1632 713/300 |
| 2010/0301998 A1* | 12/2010 | Marszalek | | G08B 13/1445 340/5.65 |
| 2011/0018498 A1* | 1/2011 | Soar | | B60N 2/44 320/108 |
| 2011/0242754 A1* | 10/2011 | Morton | | G06F 1/1632 361/679.41 |
| 2012/0154991 A1* | 6/2012 | Lei | | H04M 1/0254 361/679.01 |
| 2012/0202427 A1* | 8/2012 | Gioscia | | G06F 1/1632 455/41.2 |
| 2012/0206090 A1* | 8/2012 | Hyun-Jun | | H02J 50/10 320/107 |
| 2012/0273630 A1* | 11/2012 | Gillespie-Brown | | F16M 11/041 248/122.1 |
| 2013/0078855 A1* | 3/2013 | Hornick | | H01R 13/73 439/571 |
| 2013/0182387 A1* | 7/2013 | Mere | | G06F 1/1626 361/679.41 |
| 2013/0303000 A1* | 11/2013 | Witter | | H01R 13/6205 439/39 |
| 2014/0021909 A1* | 1/2014 | Klawon | | H02J 7/0042 320/108 |
| 2014/0232343 A1* | 8/2014 | Tadd | | H02J 7/0042 320/114 |
| 2014/0265765 A1* | 9/2014 | Khodapanah | | F16M 13/02 312/223.1 |
| 2014/0323064 A1* | 10/2014 | McCarthy | | H04B 1/40 455/77 |
| 2014/0354218 A1* | 12/2014 | Kaynar | | H02J 7/0044 320/107 |
| 2014/0355200 A1* | 12/2014 | Thiers | | H04W 88/02 361/679.41 |
| 2015/0002088 A1* | 1/2015 | D'Agostino | | H02J 7/025 320/108 |
| 2015/0162767 A1* | 6/2015 | Oh | | H02J 7/0044 320/108 |
| 2016/0003270 A1* | 1/2016 | Franklin | | F16B 1/00 439/529 |
| 2016/0040825 A1* | 2/2016 | Franklin | | F16M 13/02 439/39 |
| 2016/0105047 A1* | 4/2016 | Cui | | H01R 13/6205 320/115 |
| 2016/0125988 A1* | 5/2016 | Lee | | H01F 7/021 361/807 |
| 2016/0173667 A1* | 6/2016 | Torres Gutierrez | | H04M 1/04 455/575.1 |
| 2016/0211609 A1* | 7/2016 | Sorias | | H01R 13/6205 |
| 2016/0263385 A1* | 9/2016 | Aghassian | | H04B 5/0037 |
| 2016/0276862 A1* | 9/2016 | Herrmann | | H02J 7/025 |
| 2016/0294427 A1* | 10/2016 | Wojcik | | H04B 1/3883 |
| 2017/0110902 A1* | 4/2017 | Miller | | H02J 7/025 |
| 2017/0214260 A1* | 7/2017 | Kim | | H02J 7/0044 |
| 2017/0223440 A1* | 8/2017 | Rodrigues | | H04Q 11/0067 |
| 2017/0250563 A1* | 8/2017 | Davison | | H02J 7/025 |

* cited by examiner

FIG. 6B

UNIVERSAL MAGNETIC MOUNTING CHARGER FOR MOBILE DEVICES

BACKGROUND

The present application relates to a magnetic mount, more particularly, a universal magnetic mount with electric charging capability.

Note that the points discussed below may reflect the hindsight gained from the disclosed inventions, and are not necessarily admitted to be prior art.

Many handheld electronic portable devices are touch-screen devices. These portable devices include smart phones and media players with V3, V9, or Apple-lightning charger ports. Examples include Samsung Galaxy™ smart phones, LG™ smart phones, Apple iPhone®, Apple iPod®, and they may have incompatible charger ports. Because of their wireless network connection capability, smart phones and tablets are conveniently used for many things, most commonly such as GPS for navigation, and music playbacks. The hundreds of thousands of downloadable mobile apps continue to expand the functionality of smart phones. All these extra functionalities consume battery, and mobile devices quickly die. Cell phones frequently need to be re-charged.

Also according to the National Safety Council, more than a quarter of all car crashes in America are likely caused by driving while using cell phone devices. Many people continue to play with their cell phones in disregard their safety, the safety of others.

Previous portable device mounts have attempted to provide users with a safer means to use devices while driving. But these attempts fall short to provide users optimal safety and reliability, with consideration to efficiency and personalization.

U.S. patent application Ser. No. 29/453,019 represents an example of an unconventional design that obstructs its user's view due to an un-retractable, elongated vertical support stand.

U.S. Patent Application No. 2014201062 represents an example of a bulky mount design that not only obstructs its user view, but is also not resource-efficient. Its design includes an unnecessary array of different support fixtures, snap fittings, and attachable jaws. Should one or two components break or become faulty, it is possible that the entire design becomes compromised.

Previous portable device mounts may also have magnetic designs to provide users with an easier and more practical means of accessibility. Those magnetic designs require its users' cellular devices to be placed in special cases in order for magnetization to occur, adding additional tediousness and burden in simple use.

U.S. patent application Ser. No. 14/874,581 is an example of a design that requires its users to place their mobile devices inside of a device case in order for possible charging. Although design utilizes magnetization as a means for easy-to-use, hands-free capability, the necessary and bulky device case adds an additional step to the charging procedure that additionally takes away from user preference and device personalization.

SUMMARY

The present application discloses new approaches to safely using portable devices while driving, encouraging users to perform safer practice while on the road. The present application provides drivers a mobile battery charger that users can magnetically attach their portable devices to, with the option to charge said devices. The present application differs from its predecessors because present application's design best encourages overall safety, resource-efficiency, and ease-of-use, while maintaining users' personalization of portable device.

The compact design of present application deviates from past standards because of how efficiently compartmentalized it is. Line of sight and view of the road is not compromised and resources for design are least demanding. The present device simply comprises a (put size of) shaft that attaches to a rotation head and a (put dimension in diameter of) magnetic seat. The present application does not require a case and therefore, the amount of resources to build one, and instead uses a small, magnetic (put dimension in diameter) electrode contact board that is placed on the back of the phone, attached with a small charging cable that connects to charger port of attached device.

Further, the present application is versatile and can be used as a charging device in any home. The adhesive base of the device shaft can mount on different surfaces, such as either one's dashboard or office desk.

For the reasons mentioned, the present application best provides drivers the most conventional, easy-to-use and resource friendly mounting device for portable devices.

BRIEF DESCRIPTION OF THE DRAWINGS

The disclosed application will be described with reference to the accompanying drawings, which show important sample embodiments of the invention and which are incorporated in the specification hereof by reference, wherein.

DETAILED DESCRIPTION OF SAMPLE EMBODIMENTS

The numerous innovative teachings of the present application will be described with particular reference to presently preferred embodiments (by way of example, and not of limitation). The present application describes several embodiments, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

It is contemplated and intended that the design apply to both car mounting and at home mounting. The support body may be modified slightly to be fit to the use requirement and environment. Any suitable materials to make the construct are contemplated, for example, metal, plastic, wood, glass, and rubber. One material may be preferred to the other for the reason of cost, easiness to manufacture, and atheistic look and feels.

Figure 2:
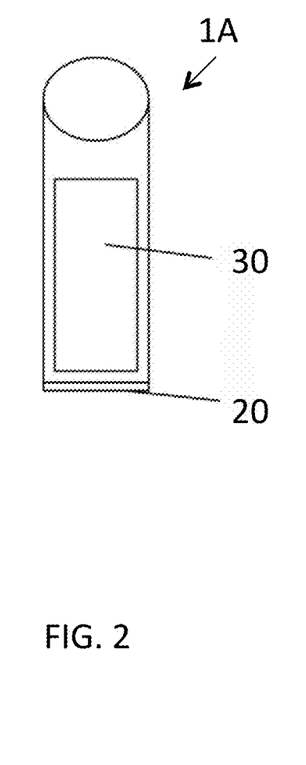
FIG. 2 is a front sectional view of the support body of FIG. 1.
Figure 3:
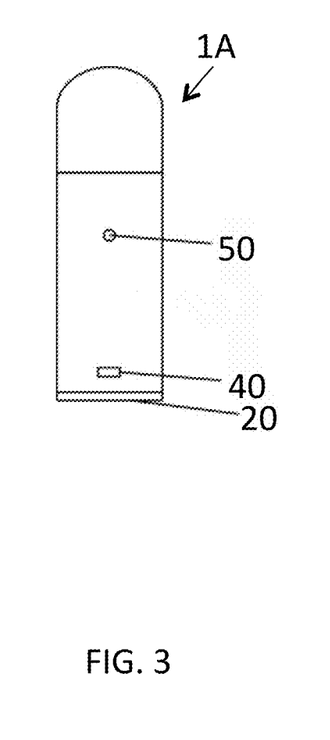
FIG. 3 is a back sectional view of the support body of FIG. 1.
Figure 4:
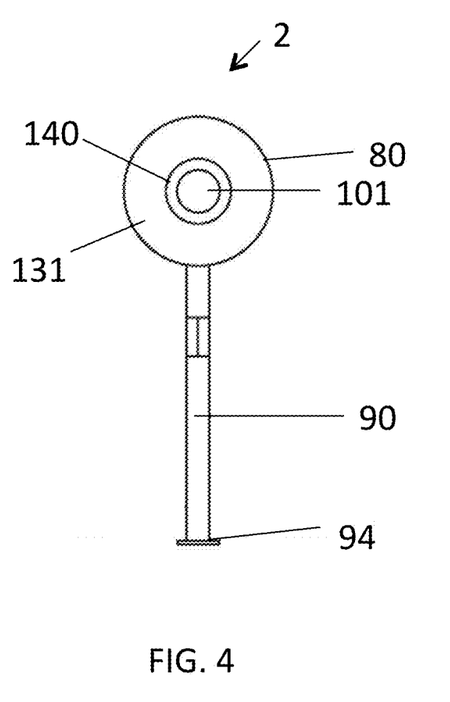
FIG. 4 is a front view of an example magnetic charger attachment seat of a mobile device mounting charger in accordance with this application.
Figure 5A:
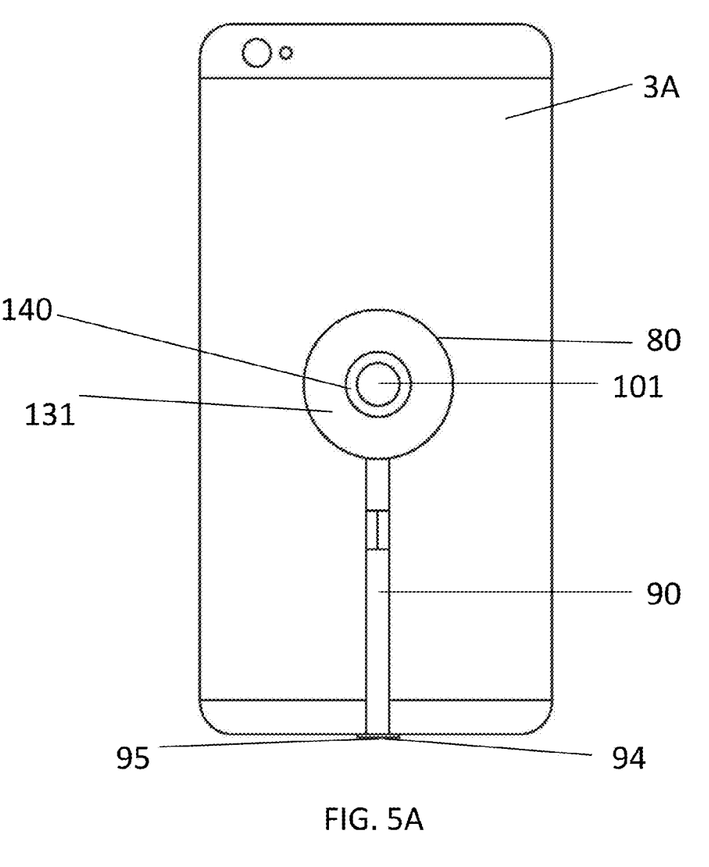
FIG. 5A is a front view of an example magnetic attachment being an integral built-in part of a cellular phone back cover in accordance with this application.
Figure 5B:
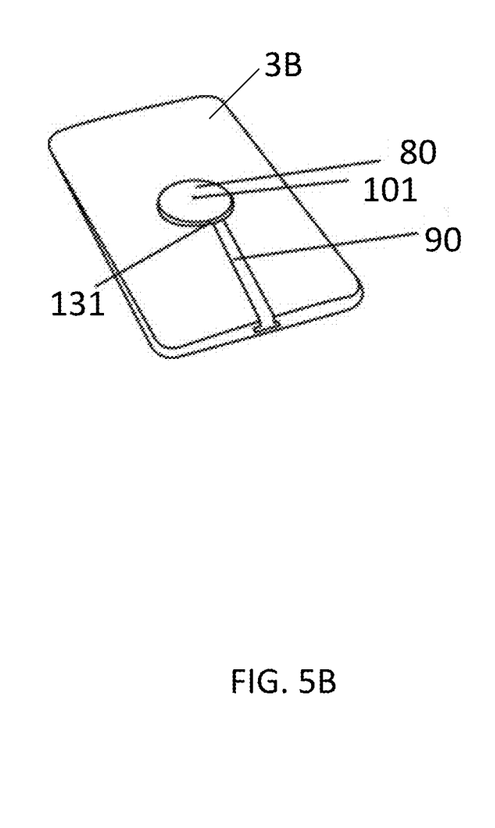
FIG. 5B is a perspective view of the magnetic attachment being an integral built-in part of a protective mobile case in accordance with this application.
Figure 6A:
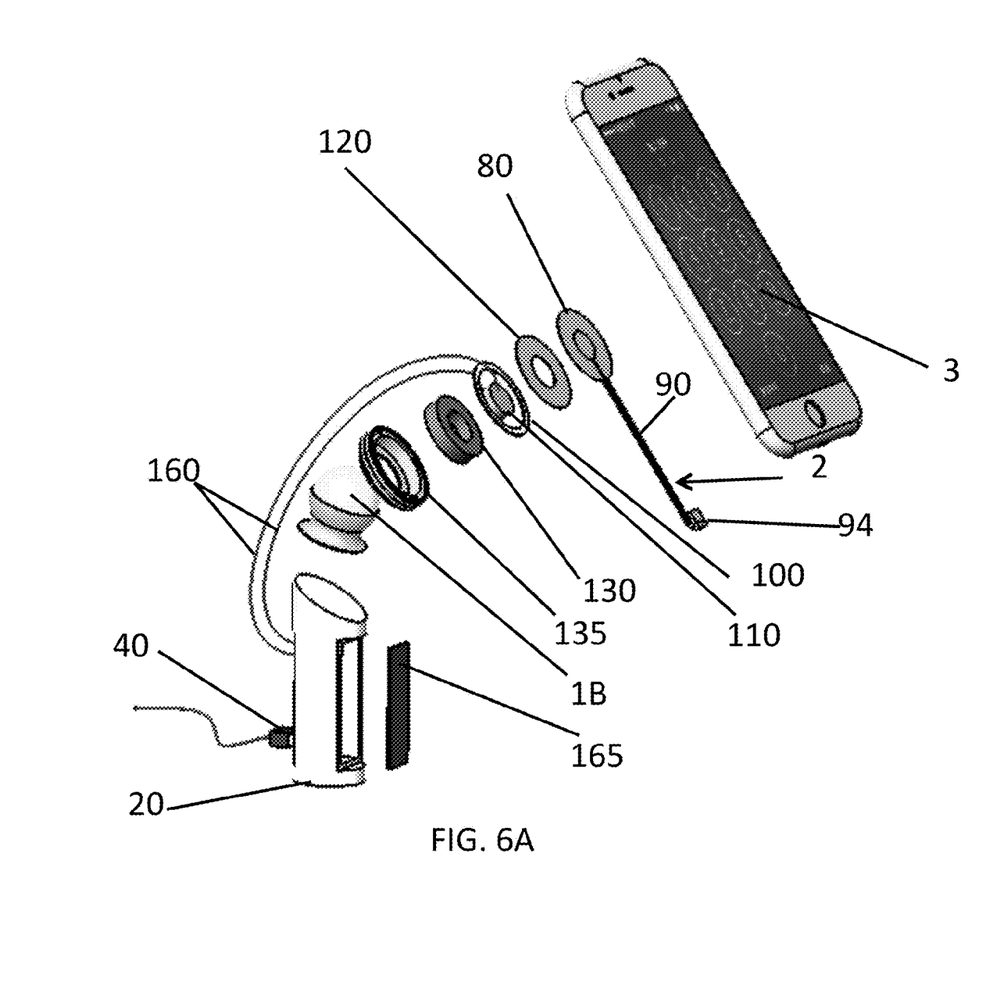
FIG. 6A is an expanded view of an example mobile device mounting charger that is attached to the back of a cell phone in accordance with this application.
Figure 6B:
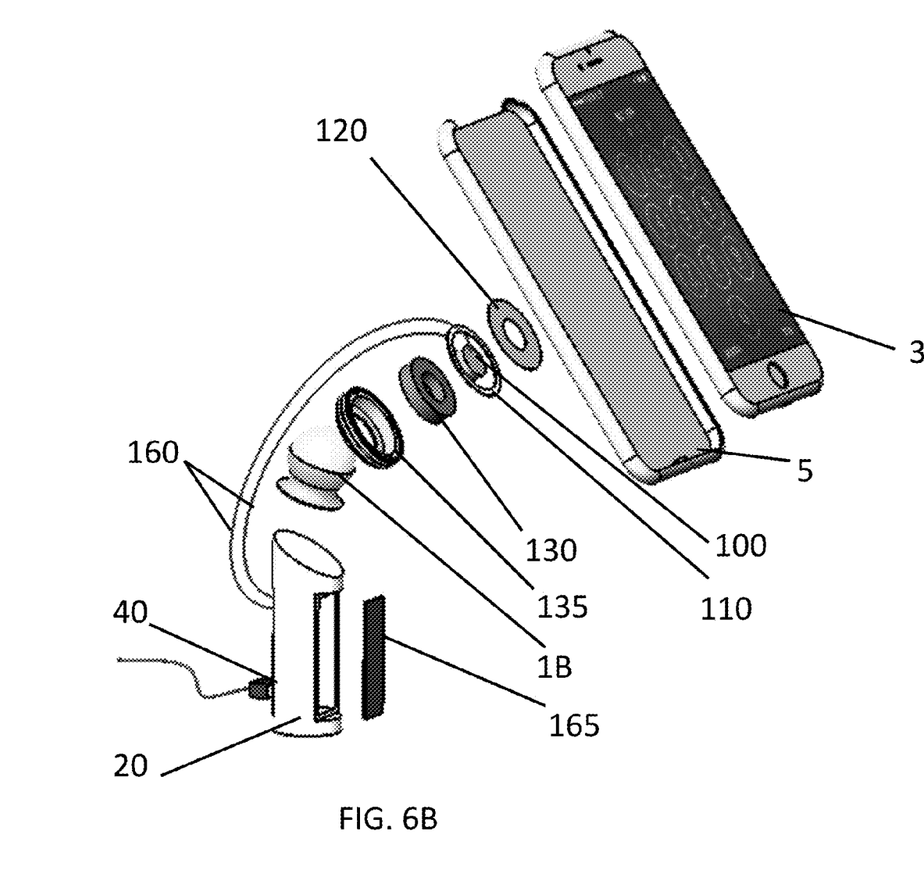
FIG. 6B is an expanded view of an example mobile device mounting charger where the magnetic attachment seat is built-in on the back cover of a cell phone in accordance with this application

In reference to FIGS. 1A-5B, a magnetic mobile device mounting charger comprises two major parts: mounting system 1 (FIGS. 1A-3) and magnetic attachment system 2 (FIG. 4-5B). FIGS. 6A and 6B demonstrate how a mobile device is attached to the described mounting device for battery re-charging.

Figure 1A:
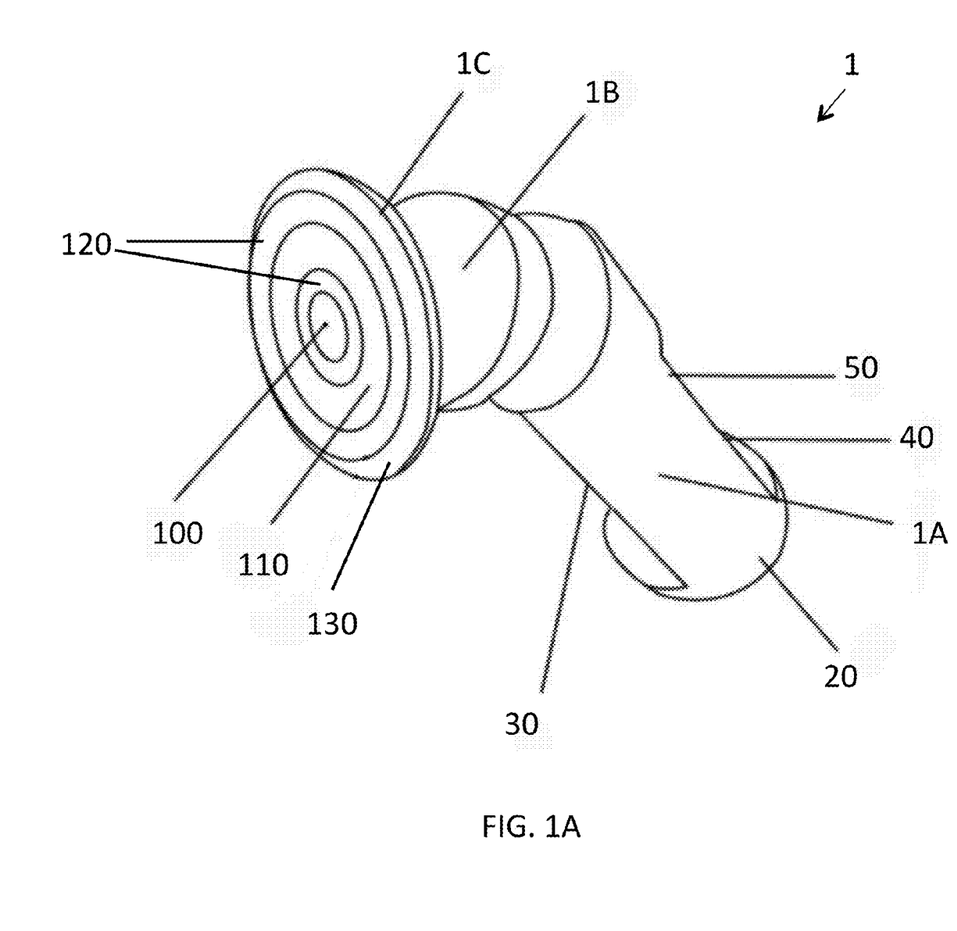
FIG. 1A is a perspective view of an example of the support body of a mobile device mounting charger in accordance with this application.

FIG. 1A shows mounting system 1, in which magnetic attachment system 2 as seen in FIGS. 4, 5A, and 5B attaches to, via charging head 1C.

Referring to FIG. 1A, mounting system 1 includes a top charging and mounting head shaped like a filled wide-brimmed sun hat 1C, a rotation ball connector 1B and a cylindrical tubular support body 1A with an adhesive footing section 20.

Circularly shaped charging head 1C includes positive electrode column or pin 100 in the center, negative peripheral electrode ring 110 and insulation ring or rings 120 that separates center electrode 100 and peripheral electrode 110, and a magnet piece 130 disposed underneath a decorative surface layer at the brim of charging head 1C for mounting. Insulation ring 120 may embed printed circuit for conducting electricity. Magnet ring 130 can either be made of permanent magnet material or alternatively magnetic induction coil which generates a magnetic field when electricity is connected. Magnet ring 130 is configured to have sufficient magnetic force that sufficiently attracts attachment system 2 for mounting and holding a cell phone or a mobile device to the support stand 1A.

Charging head 1C attaches to swivel ball rotation portion 1B that is configured to rotate 360° C. in all directions, but also with built-in threads to hold an attached cell phone at one position until a user changes to another position in another direction.

Figure 1B:
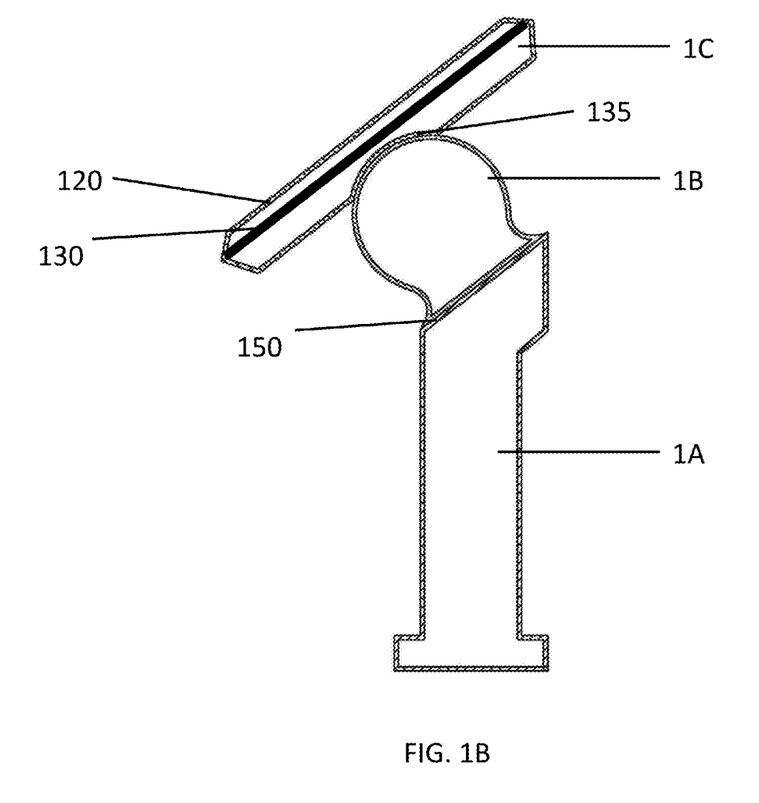
FIG. 1B is a vertical sectional view of a mobile device mounting charger in FIG. 1A.

As shown in FIG. 1B, swivel ball rotation portion 1B includes a rotatable neck portion 150 that is threadedly coupled to the top of support stand 1A and allows portable device to rotate freely at 360 degrees. Swivel ball 1B is rotatably coupled charging head 1C through a threaded coupling-ring structure 135 (an example as shown in FIG. 6A). The expanded side views in FIGS. 6A and 6B of mounting system 1 display how a portable device may attach to mounting system 1. FIG. 1B provides a sectional view of the mounting charger system only for illustrative purposes, each of the individual parts may not be drawn in proportion, to provide clearer interpretation of present application in illustrating the structural relationship between portion 1C, 1B and 1A.

Support stand includes a tubular body, an adhesive footing base, a power supply port, and an electrical outlet, as will be described in greater detail below. Inside tubular body, a printed circuit board for functional control and power adapting may be contained. Adhesive footing base may be built with a layer of adhesive materials such as 3M® adhesive tapes or SCOTCH® adhesives that allows support stand 1A to be removably mounted to a car window shield glass or plastic front or to a supporting surface.

FIG. 2 shows a vertical front view of support stand 1A, with display of location of adhesive base 20 and tubular body 30. Adhesive base 20 consists of a strong enough adhesive layer that allows support stand 1A to securely stick on multiple surfaces and maintain stability, with all impediments encountered by a moving vehicle. Tubular supporting body 30 may include a decorative groove that consists of a multi-colored light-up feature, indicative of a successful charge.

FIG. 3 shows a vertical back view of support stand 1A, with display of location of power supply port 40 and electrical outlet 50. Preferably power supply port 40 is located on the back and towards the bottom of support stand 1A. Through power supply port 40 mounting system 1 receives its power from an external power source, such as connection to a car charger. Electric outlet 50 may be connected via external wire cables or internal built-in wires to positive electrode 100 and negative electrode 110 to provide charging electricity to a cell phone or other mobile devices.

FIG. 4 shows an example front view the magnetic attachment seat/system 2, including a magnetic electrode contact board 80 with thickness less than a coin, a positive electrode column 101, and a charging cable 90 with a male connector head 94. The magnetic attachment system 2 is intended to attach to the back of a portable device, such as a cell phone, an IPAD, as displayed in FIG. 6A. Alternatively, the construct of system 2 can be a built-in section of a mobile case or a back cover as shown in FIGS. 5A, 5B and 6B.

Magnetic electrode contact board 80 is configured to match the structure of charging head 1C. It includes an electrode column 101 at the center region and a ferromagnetic ring 131 that can be made of iron capable of being magnetized or permanent magnetic material at the peripheral area. Ferromagnetic materials include ironic piece, nickel or cobalt materials. Ironic or ferromagnetic ring 131 also serves as the negative electrode for contacting negative electrode 110, and is connected with the negative cable line of 90. Between ferromagnetic ring 131 and electrode 101 is an insulation ring 140. Magnet ring 130 and ferromagnetic piece 131 respectively on the charging head 1C and on the magnetic attachment seat 2 preferably match in size and they attract with each other with sufficient magnetic force that is capable of holding a cell phone's weight on support stand 1A. But the force is also sufficiently weak enough for a person to separate a phone from the mounting charger support 1. The contacting between electrode 100 of charging head 1C and the electrode 101 of attachment seat 2 will allow the conduit of electric current and the charging of the battery of an attached phone or mobile device. The strong magnetic attraction force between magnet ring 130 of charging seat 1C and ironic ring 131 of attachment seat 2 eliminates the requirement of use of bulky holding case, and enabling a user hands free use of the mobile device. Attachment seat 2 has an adhesive side that glues or attaches the attachment 2 to the back of cell phone.

The charging head 1C preferably is thin panel or disk, and attachment seat 2 system preferably is thin panel or disk, ranging in size from 0.5 to 5 cm in diameter, and 0.1 to 1 cm in thickness.

In reference to FIG. 5A, alternatively an embodiment of attachment seat 2 system is constructed as an integral piece of a mobile device back cover 3A where charging head 94 of cable 90 sits inside an opening 95 that matches to a mobile device's charging port.

In reference to FIG. 5B, alternatively an embodiment of attachment seat 2 system is constructed as an integral piece of a protective holding case a mobile device 3B.

Charging cable 90 may include one or multiple charging heads 94, such as, a lightning plug head, or a micro USB plug head, that matches to a smart phone to mobile device's charging port. As shown in FIG. 6A, charging cable 90 directly plugs into the charger port of mobile device 3. Comparing to wireless charging in prior art, wired charging is much more efficient, saves battery source and can be manufactured more cost effectively. With magnetic attachment system 2 attached to a mobile device 3, said mobile device 3 can magnetically attach to charging seat 1C and mounting system 1 during user driving, effectively reducing safety risks of using a smart phone as a GPS during driving.

In reference to FIG. 6A, expanded view for attaching an example mounting charger 1 to a cell phone 3. The wires 160 are connected from electric outlet 50 to the charging electrodes 100 and 110. Magnet ring 130 attracts attachment board 80 that is mounted on the back cover of cell phone 3. Coupling ring 135 couples the charging head set with the swivel ball section 1B and also holds it at one position until the user rotates the ball and changes the holding direction. Cylindrical support 1A includes a printed circuit board 165 for control and indication of successful charging or other functions.

In reference to FIG. 6B, expanded view for attaching a mounting charger to an attachment seat built-in on the back cover 5 of a cell phone 3. The wires 160 are connected from electric outlet 50 to the charging electrodes 100 and 110. Magnet ring 130 attracts attachment board 80 that is mounted on the back cover of cell phone 3. Coupling ring 135 couples the charging head set with the swivel ball section 1B and also holds it at one position until the user rotates the ball and changes the holding direction. Cylindrical support 1A includes a printed circuit board 165 for control and indication of successful charging or other functions In further reference to FIG. 4, FIG. 5A, 5B, FIGS. 6A and 6B, magnetic device attachment 2 and charging head 1C will come in varying shapes and sizes, with different charging cables to accommodate different portable devices with V3, V9, or Apple-lightning charger ports, SAMSUNG® cell phones and mobile devices. To note, not all portable devices will have charger ports at the bottom of devices. The present application provides varying magnetic device attachment 2 dependent of portable device design.

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. A mounting charger for a mobile device, comprising:
    a magnetic attachment seat having a first side surface, said first side surface having a center region and a peripheral region, said center region being configured as an electrode and said peripheral region being a ferromagnetic ring-piece;
    a charger cable having a first end and a second end, said first end is physically connected with said electrode of said magnetic attachment seat, and said second end being configured with a battery charging plug that matches to a mobile device's charging port; and
    a mounting charger body having a charging head, a rotatable neck portion and a cylindrical support stand, said charging head having a center region and a peripheral region, said center region being configured as an electrode (32) and said peripheral region being configured as a magnet, wherein said electrode of said charging head is connected with a power supply cable and said magnet of said charging head and said ferromagnetic ring-piece of said attachment seat attract with each other with sufficient magnetic force that enables said mounting charger body to grip a mobile device that is attached to said attachment seat.

2. The mounting charger of claim 1, wherein said attachment seat and said charging head are both configured in matching size and shaped as a circular disk.

3. The mounting charger of claim 1, wherein said rotatable neck portion is configured in a shape of a ball with a mounting section capable of rotating in all directions and has grooves for holding at one direction.

4. The mounting charger of claim 1, wherein said charging head has a region for embedding printed circuits for conducting electricity.

5. The mounting charger of claim 1, wherein said cylindrical support stand further is installed with a panel of printed circuit board for power control.

6. The mounting charger of claim 1, wherein said magnet of said charging head and said magnet of said magnetic attachment seat are configured in a shape of circular ring.

7. The mounting charger of claim 1, wherein said cylindrical support stand has a foot section that is adhesive to glass or plastic surface.

8. The mounting charger of claim 1, wherein said cylindrical support stand is configured with a power cord to accept power supply from an automobile.

9. The mounting charger of claim 1, wherein said magnetic attachment seat is a built-in integral piece of a mobile device's back cover.

10. The mounting charger of claim 1, wherein said magnetic attachment seat is a built-in integral piece of a protective case for a mobile device.

11. A method for charging a mobile device, comprising the actions of:
- constructing a magnetic attachment seat having a first side surface, said first side surface having a center region and a peripheral region, said center region being configured as an electrode and said peripheral region being a ferromagnetic ring-piece;
- constructing a charger cable having a first end and a second end, said first end is physically connected with said electrode of said magnetic attachment seat, and said second end being configured with a battery charging plug that matches to a mobile device's charging port;
- attaching said magnetic attachment seat to the mobile device's back cover;
- plugging in said second end of said charger cable to said mobile devices' charging port;
- constructing a mounting charger body having a charging head, a rotatable neck portion and a cylindrical support stand, said charging head having a center region and a peripheral region, said center region being configured as an electrode and said peripheral region being configured as a magnet;
- attaching said magnetic attachment seat to said charging head via said magnet;
- contacting said electrode of said charging head with said electrode of said magnetic attachment seat; and
- plugging power supply to said mounting charger.

12. The method of claim 11, wherein said attachment seat and said charging head are both configured in matching size and shaped as a circular disk.

13. The method of claim 11, wherein said rotatable neck portion is configured in a shape of a ball with a mounting section capable of rotating in all directions and has grooves for holding at one direction.

14. The method of claim 11, wherein said charging head has a region for embedding printed circuits for conducting electricity.

15. The method of claim 11, wherein said cylindrical support stand further is installed with a panel of printed circuit board for power control.

16. The method of claim 11, wherein said magnet of said charging head and said magnet of said magnetic attachment seat are configured in a shape of circular ring.

17. The method of claim 11, wherein said cylindrical support stand has a foot section that is adhesive to glass or plastic surface.

18. The method of claim 11, wherein said cylindrical support stand is configured with a power cord to accept power supply from an automobile.

19. The method of claim 11, wherein said magnetic attachment seat is a built-in integral piece of a mobile device's back cover.

20. The method of claim 11, wherein said magnetic attachment seat is a built-in integral piece of a protective case for a mobile device.

* * * * *